Sept. 15, 1931.  C. S. SCHROEDER  1,823,380
TRUCK
Filed May 4, 1929   2 Sheets-Sheet 1
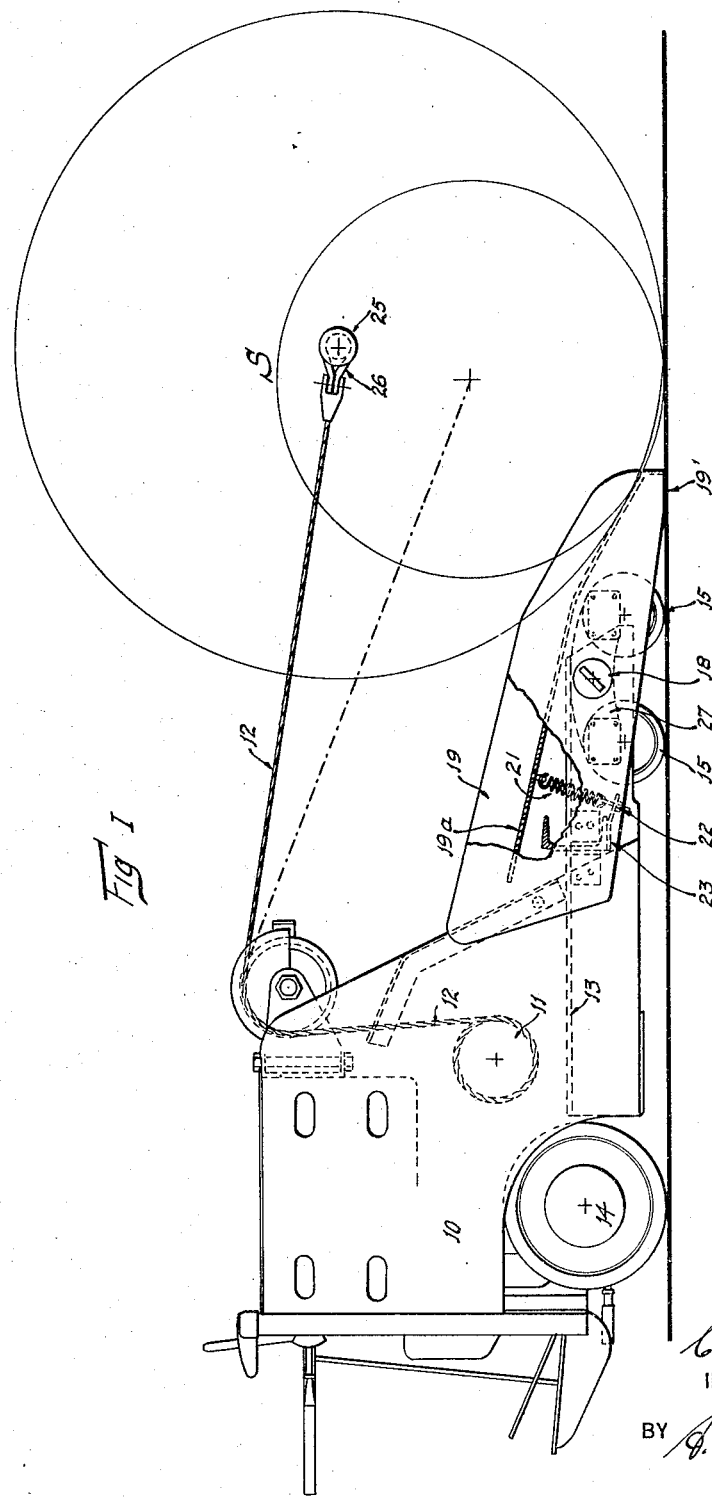
C. S. Schroeder
INVENTOR
BY J. H. Golden
ATTORNEY Sept. 15, 1931. C. S. SCHROEDER 1,823,380
TRUCK
Filed May 4, 1929 2 Sheets-Sheet 2
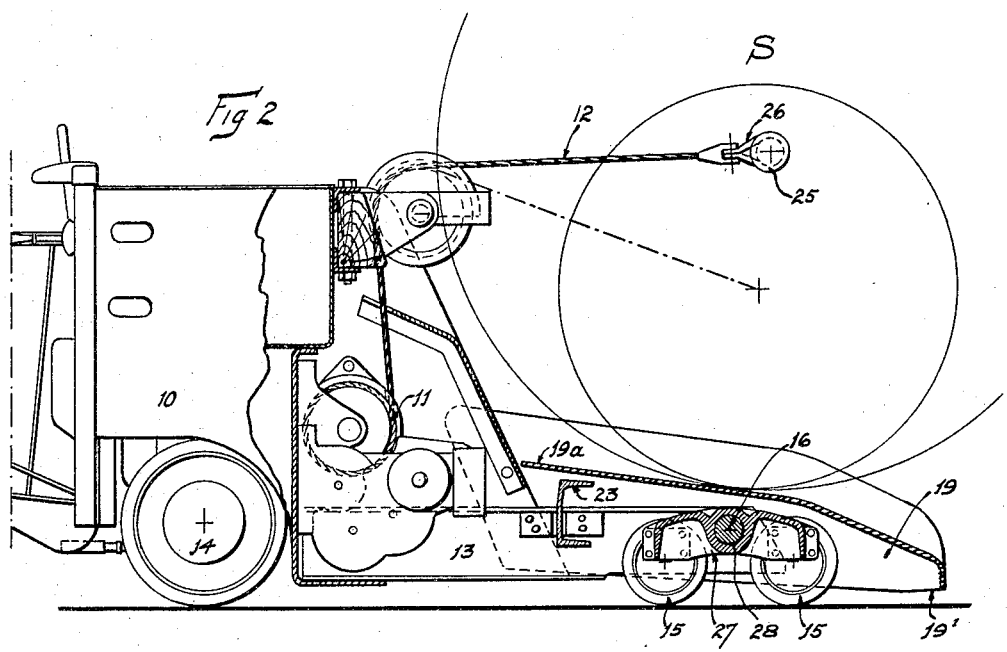
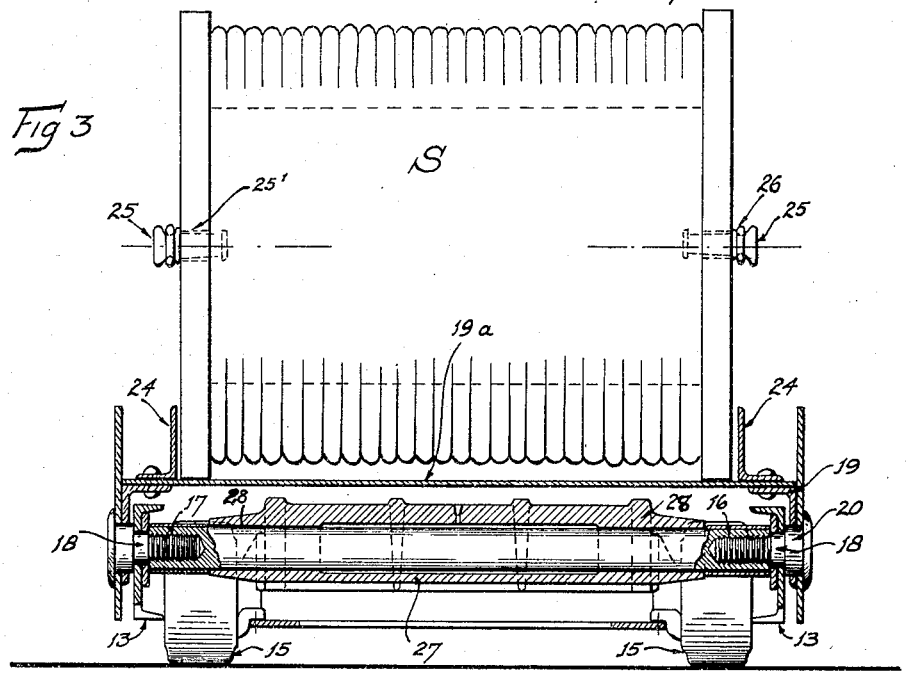
C. S. Schroeder
INVENTOR
BY J. H. Golden
ATTORNEY Patented Sept. 15, 1931

1,823,380

UNITED STATES PATENT OFFICE

CHARLES S. SCHROEDER, OF STAMFORD, CONNECTICUT, ASSIGNOR TO THE YALE & TOWNE MANUFACTURING COMPANY, OF STAMFORD, CONNECTICUT

TRUCK

Application filed May 4, 1929. Serial No. 360,543.

This invention relates to industrial trucks of the type used in handling heavy loads in manufacturing plants and warehouses.

My invention relates especially to an industrial truck adapted to pick up and carry away heavy loads which are to be placed on the truck without the use of manual labor. More especially, my particular truck is designed to pick up and carry away reels of heavy cable wire wound on large reeling spools.

It has been customary in handling such loads to lift the spool bodily by some elevating means carried by the truck, and then to carry the same away on these elevating means. In some instances, the truck body has been cut away to allow the spool to enter between two elevating arms which then come bodily against a rod carried by the center bore of the spool and lift the same off the ground. In other cases, a wedging platform has been adapted to enter under the cable spool where it is then elevated by means carried on the truck.

The object of this invention is to devise the truck so that the spool may be rolled on to the truck platform by a reeling mechanism carried by the main truck frame. It will be readily appreciated that when the cable spool first comes into contact with the truck body it has a tendency to rotate that truck body about the rear axle assembly.

Furthermore, if a spool were sufficiently heavy, it would tend to raise the forward end of the truck with the rear axle acting as a pivot or fulcrum. In order to overcome this tendency, and relieve the rear axle from the terrific forces which are ordinarily brought to bear by the combined action of the spool weight and the truck reeling mechanism, I have equipped my truck with a pivoted platform. This platform, when subjected to the load, automatically comes to an inclined position and rests one end upon the ground so as to permit the cable spool to be rolled upward on the inclined surface presented. It will be readily understood, that as the reel or cable spool is rolled up on this inclined platform it will gradually tend to bring the same to a more horizontal position. The platform will finally reach a substantially horizontal position with the weight of the cable roll distributed between the front and rear wheels and with the rear end removed from the ground, so that the truck may be actuated to carry the cable spool to any desired location.

For a detailed description of my invention, I refer to the drawings accompanying this application wherein Fig. 1 is an elevation and partial section of my truck showing a cable spool about to be rolled on to the platform of the truck. Fig. 2 illustrates in section the position of the various truck parts after the cable spool has been rolled further up the platform. Fig. 3 is a section of the truck body along the line of the rear pivot shaft and shows one method of pivoting the platform relatively to the truck frame.

Referring more particularly to the drawings, reference numeral 10 indicates the usual type of industrial truck, equipped with a motor reeling device 11, a cable 12, and having the usual main frame 13 supported by the front wheels 14 and rear wheels 15.

The frame 13 has suitably mounted thereon the axle or pivot shaft 16 as shown in detail in Fig. 3. This shaft is threaded at 17, the threaded studs 18 being adapted to cooperate with these threads to hold the rear axle shaft 16 in its designated position relatively to the frame. The pivoted platform 19 is freely mounted on the portions 20 of the studs 18, and is normally urged to a substantially horizontal position by the spring 21 (Fig. 1), which is carried at 22 by an angle iron 23 fixed to the frame 13. The platform 19 is designed to rest by gravity on the support 23, but the spring 21 is supplied to hold it in position against jarring and bumping when the truck is traveling unloaded. Additional angle irons 24 are mounted on the platform 19 and are adapted to maintain the cable reel in position on the truck.

The rear wheels 15 are carried by a rear wheel assembly 27, this rear wheel assembly being equipped with a bearing member 28 by means of which it is mounted on the pivot shaft 16. This pivot shaft 16 therefore acts not only as a support for the rear wheels of the truck, but also as a support for the tilting platform which is pivoted freely in relation to the rear wheels and the main truck body.

I have illustrated the cable reel S in two sizes in order to show the adaptability of the truck. In order to utilize the truck reeling mechanisms 11 and 12 to pull the reel on to the platform, I use the plugs 25 which are adapted to be inserted into central holes 25' in the cable spool. The cable 12 is equipped with eyelets 26 which fit over these plugs and act to move the spool when the motor mechanism 11 is actuated.

The operation of my invention is as follows: When it is desired to pull the cable spool S on to the truck, the plugs 25 are inserted into the spool holes 25' at each end, and the eyelets 26 of the cable 12 are attached to the same. The winding mechanism 11 is then actuated and the cable 12 will act to pull the spool toward the platform 19. When the spool first comes in contact with the pivoted platform 19, it will tilt the same against the force of the spring 21 until the rear end of the platform is brought to the ground at the point 19'. It will be understood that this will establish the fulcrum for the spool load and the reeling forces at the point 19', and will therefore remove those stresses from the rear pivot shaft 16.

Further reeling of the cable 12 will act to bring the spool S to the position shown in Fig. 2 wherein the platform 19 will be in a more fully horizontal position. Still further movement of the spool upward on the platform will cause the same to come into a substantially horizontal position with the platform floor 19a resting on the angle iron 23 secured to the frame.

The platform is not allowed to come to a fully horizontal position in order to allow for easy movement of the spool off the platform floor 19a when the pull on cable 12 is relaxed.

It is thus seen, that by the combination of my reeling mechanism acting on the load in conjunction with the automatic tilting and leveling platform 19, I am able to remove the fulcrum for the various loads and pulling forces from the normal place at the pivot shaft 16 to the rear end of the tilting platform at the point 19'. Furthermore, the fulcrum will remain at that point until the entire load of the spool is above the axle or rear pivot shaft 16, so that that rear shaft 16 need merely be designed for the carrying of the heavy spool load. It should be furthermore understood, that by initially establishing the fulcrum at the point 19', I avoid the necessity of loading the forward end of the truck to offset the extremely heavy load component acting at the axle shaft 16 to tilt the forward end of the truck upwardly.

What is claimed is:—

1. In an industrial truck, a truck frame, a single unitary load platform for said truck pivotally mounted relatively to said frame, and normally resting thereon a rear wheel assembly also pivoted on said frame, said load platform being shaped for contact with the load so as to tilt automatically on its pivot and bring its rear end against the ground when initially subjected to the weight and contact of the load, in order to create a fulcrum at that point for said load weight and relieve the rear wheel assembly from the same, and reeling means on said frame for manipulating the load relatively to said tilting platform.

2. In an industrial truck, a truck frame, a single unitary load platform for said truck pivotally mounted relatively to said frame, means arranged to yieldingly urge said platform into a normally horizontal position relatively to said frame, means on said truck for pulling a load on to said platform, said platform being adapted to pivot automatically and rest one end against the ground when initially subjected to the weight and contact of the load, said load and platform being arranged so that the load will tend to move off said platform unless held by a constant pressure of said pulling means.

3. In an industrial truck, a truck frame, a single unitary platform for said truck pivotally mounted relatively to said frame, means adapted to bring said platform to rest on the frame, a reeling mechanism mounted on said frame, said reeling mechanism being adapted to pull a floor level load on to said platform and to maintain said load on the platform, said platform being adapted to pivot automatically and bring its rear end against the floor when initially subjected to the contact and weight of said load, and to gradually move to a more horizontal position as the load is hauled further up the platform by said reeling mechanism, said platform having an inclined plane bottom so that when the reeling mechanism is released the load will tend to move off said platform substantially in the manner it was moved on to the same.

4. In an industrial truck, a truck frame, a single unitary load platform for said truck pivotally mounted relatively to said frame and yieldingly maintained in a substantially horizontal position, reeling means carried by said frame and adapted to pull a substantially circular load on to said platform, said load being adapted to have a portion of its circular periphery contact with said platform when pulled by said reeling mechanism so as to cause the weight and contact of the load to tilt said platform, said tilting movement being adapted to bring the rear end of the platform against the ground to create a substantial fulcrum at that point for said load and pulling stresses, said platform having an inclined plane bottom on which the load rests so that when the reeling mechanism is released, the load will tend to roll off said platform substantially in the manner that it was rolled on to the same.

5. In an industrial truck, a truck frame, a pair of studs mounted on said frame, a load platform mounted on said studs for pivotal movement relatively to the same, and to said frame, a shaft supported by said studs, and a wheel assembly pivotally mounted on said shaft.

Signed at Stamford in the county of Fairfield and State of Connecticut this 26th day of April A. D. 1929.

CHARLES S. SCHROEDER.